United States Patent
Li et al.

(10) Patent No.: US 11,436,531 B2
(45) Date of Patent: Sep. 6, 2022

(54) MACHINE LEARNING-POWERED RESOLUTION RESOURCE SERVICE FOR HCI SYSTEMS

(71) Applicant: VMware, Inc., Palo Alto, CA (US)

(72) Inventors: Hui Li, Fremont, CA (US); Arun Rajan, Sunnyvale, CA (US); Jonathan Prince Limhengco, San Francisco, CA (US); Luong Duy Duong, Fremont, CA (US); Zhengxun Wu, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 535 days.

(21) Appl. No.: 16/680,986

(22) Filed: Nov. 12, 2019

(65) Prior Publication Data

US 2021/0142212 A1    May 13, 2021

(51) Int. Cl.
  *G06N 20/00* (2019.01)
  *G06N 5/02* (2006.01)
  *G06F 11/07* (2006.01)
  *G06K 9/62* (2022.01)
  *G06F 11/22* (2006.01)

(52) U.S. Cl.
  CPC ......... *G06N 20/00* (2019.01); *G06F 11/0793* (2013.01); *G06K 9/6218* (2013.01); *G06N 5/02* (2013.01); *G06F 11/2263* (2013.01)

(58) Field of Classification Search
  CPC ...... G06N 20/00; G06N 5/02; G06F 11/0793; G06F 11/2263; G06K 9/6218
  USPC .......................................................... 706/12
  See application file for complete search history.

(56) References Cited

U.S. PATENT DOCUMENTS

| 9,225,621 | B2 | 12/2015 | Tseitlin et al. | |
| 2019/0361896 | A1* | 11/2019 | Brunets | G06F 16/26 |
| 2019/0370398 | A1* | 12/2019 | He | G06F 16/686 |
| 2020/0394257 | A1* | 12/2020 | Santoso | G06F 16/90324 |
| 2021/0326717 | A1* | 10/2021 | Mueller | G06Q 50/10 |

OTHER PUBLICATIONS

Kedia, Rishika, et al., "Predictive Analytics for Storage Management Using Time-Series Forecasting Techniques", 2019 IEEE International Conference on Cloud Computing in Emerging Markets (CCEM), Bengaluru, India, Sep. 19-20, 2019, pp. 40-44.*

(Continued)

*Primary Examiner* — Robert Stevens
(74) *Attorney, Agent, or Firm* — Kim & Stewart LLP

(57) ABSTRACT

A method of processing requests from users of a computer system having software and hardware components, wherein each request includes a description of an software or hardware issue, includes: upon receiving a first request, performing content matching using a first instance of the data model to determine if the issue described in the first request has been previously encountered; executing a machine learning algorithm against a new data set to update a second instance of the data model; after the second instance of the data model has been updated, switching the data model used for performing content matching from the first to the second instance of the data model; and upon receiving a second request after the switch, performing content matching using the second instance of the data model to determine if the issue described in the second request has been previously encountered.

20 Claims, 6 Drawing Sheets

(56) References Cited

OTHER PUBLICATIONS

Banerjee, Amitabha, et al., "A Cloud Performance Analytics Framework to Support Online Performance Diagnosis and Monitoring Tools", ICPE '19, Session 7: Cloud Computing II, Mumbai, India, Apr. 7-11, 2019, pp. 151-158.*

Bojanowski et al. "Enriching word vectors with subword information," Transactions of the Association for Computational Linguistics, vol. 5, Jun. 2017, pp. 135-146.

Buzachis et al. "Towards Osmotic Computing: a Blue-Green Strategy for the Fast Re-Deployment of Microservices," 2019 IEEE Symposium on Computers and Communications (ISCC), Barcelona, Spain, 2019, pp. 1-6.

Yang et al. "Service Discovery based Blue-Green Deployment Technique in Cloud Native Environments," 2018 IEEE International Conference on Services Computing (SCC), San Francisco, CA, 2018, pp. 185-192.

* cited by examiner

500

Here is the issue description
Problem Description: Errors occurred on the disk(s) of a vSAN host
Product Domain (optional): ESX
Product Sub-category (optional): xSAN Go Back to Dashboard

KB Information for Request ID: fdf92abd-83e2-404d-bd2f-c736e4452c74

| URL | Similarity Score | Title | Summary | Review Score | Review |
|---|---|---|---|---|---|
| http://kb.vmware.com/doc2663 | 0.711 | Creating vSAN Disk Group fails with the error: General vSAN error | In a vSAN cluster, when the lockdown mode is enabled in the host for security functions, … | 3.5 | View/Add |
| http://kb.dell.com/doc1137 | 0.741 | There is no more space For virtual disk write Error when starting vSANDisk | The purpose of this article is to explain the Cause of the no more space for virtual error and information to resolve error | 2.8 | View/Add |
| http://kb.vmware.com/doc2523 | 0.711 | Creating vSAN Disk Group help with the error: General vSAN error | In a vSAN cluster, when the lockdown mode is enabled in the host for security functions, … | 3.5 | View/Add |
| http://kb.microsoft.com/doc1137 | 0.741 | There is no more space For virtual disk write Error when starting vSANDisk | The purpose of this article is to explain the Cause of the no more space for virtual error and information to resolve error | 2.8 | View/Add |

SR Information

| Product | Category | Summary | Case Number | Date Created | Review Score | Review |
|---|---|---|---|---|---|---|
| Vmware vSAN 0.x | | Node2 report the "Error occurred on the disk(s) of a vSAN host" | VM3862862881 | 14 June 2018, 13:31:35 | 0 | View/Add |

Engineering Insight

| Workaround | File By Version | Found in Version | Review Score | Review |
|---|---|---|---|---|
| | vSAN 2019-03 | vSphere 6.5 | 3.0 | View/Add |

FIGURE 5

MACHINE LEARNING-POWERED RESOLUTION RESOURCE SERVICE FOR HCI SYSTEMS

BACKGROUND

In recent years, propelled by growing adoption of hyper-converged infrastructure (HCI) deployment, more and more software and hardware components are deployed as part of an HCI system. HCI deployment and management software has become a focal point interacting with a complex set of component stacks encompassing multiple software and hardware layers of different vendors. This brings in particular challenges to both users and providers of such HCI system to resolve any user-facing issues.

A major challenge in diagnosing and solving user-facing issues in an HCI system is that the various components making up the HCI system are manufactured and sold by different vendors. As a result, it is difficult to figure out which layer of a computer system (e.g., software, hardware, or firmware) a particular issue belongs to and thus where to look for resolution guidance. It is also difficult for a user to work with multiple online resource sites such as Knowledge Base (KB) databases storing KB articles, or user community databases or chat rooms to search and look for help. Additionally, the search availability and effectiveness vary with vendors.

Improving the user-level error messages at HCI software layer will help but only to a certain extent, because the HCI software layer is just a top orchestration layer. Often, the error arises from layers below. The HCI software layer does not have direct control or full interpretation over those error messages. In addition, such methodology fundamentally relies on the customers' ability to digest and resolve those errors which very likely may be the weakest link.

Given the popularity of HCI deployments, it is envisioned that HCI systems will take on more and more components to accelerate a business' critical deployment needs. Therefore, HCI component stacks will likely become increasingly complex, and solving of any issues arising from the HCI components stacks will likely become increasingly time consuming and frustrating for customers and for HCI vendors attempting to resolve those issues.

SUMMARY

One or more embodiments provide a method of processing requests from one or more users of a computer system having software and hardware components, wherein each of the requests includes a description of an issue with one of the software and hardware components. The method according to one embodiment includes the steps of: executing a machine learning algorithm against data sets of prior requests and associated prior responses to generate a data model; upon receiving a first request, performing content matching using a first instance of the data model to determine if the issue described in the first request has been previously encountered; executing the machine learning algorithm against a new data set to update a second instance of the data model, the new data set including one or more requests made after the prior requests, and responses associated therewith; after the second instance of the data model has been updated, switching the data model used for performing content matching from the first instance of the data model to the second instance of the data model; and upon receiving a second request after the data model used for performing content matching has been switched from the first instance of the data model to the second instance of the data model, performing content matching using the second instance of the data model to determine if the issue described in the second request has been previously encountered.

Further embodiments include, without limitation, a non-transitory computer-readable storage medium that includes instructions for a processor to carry out the above method, and a computer system that includes a processor programmed to carry out the above method.

BRIEF DESCRIPTION OF THE DRAWINGS

FIG. 5 is a sample dashboard that illustrates resolution resources returned to a user.

DETAILED DESCRIPTION

Figure 1:
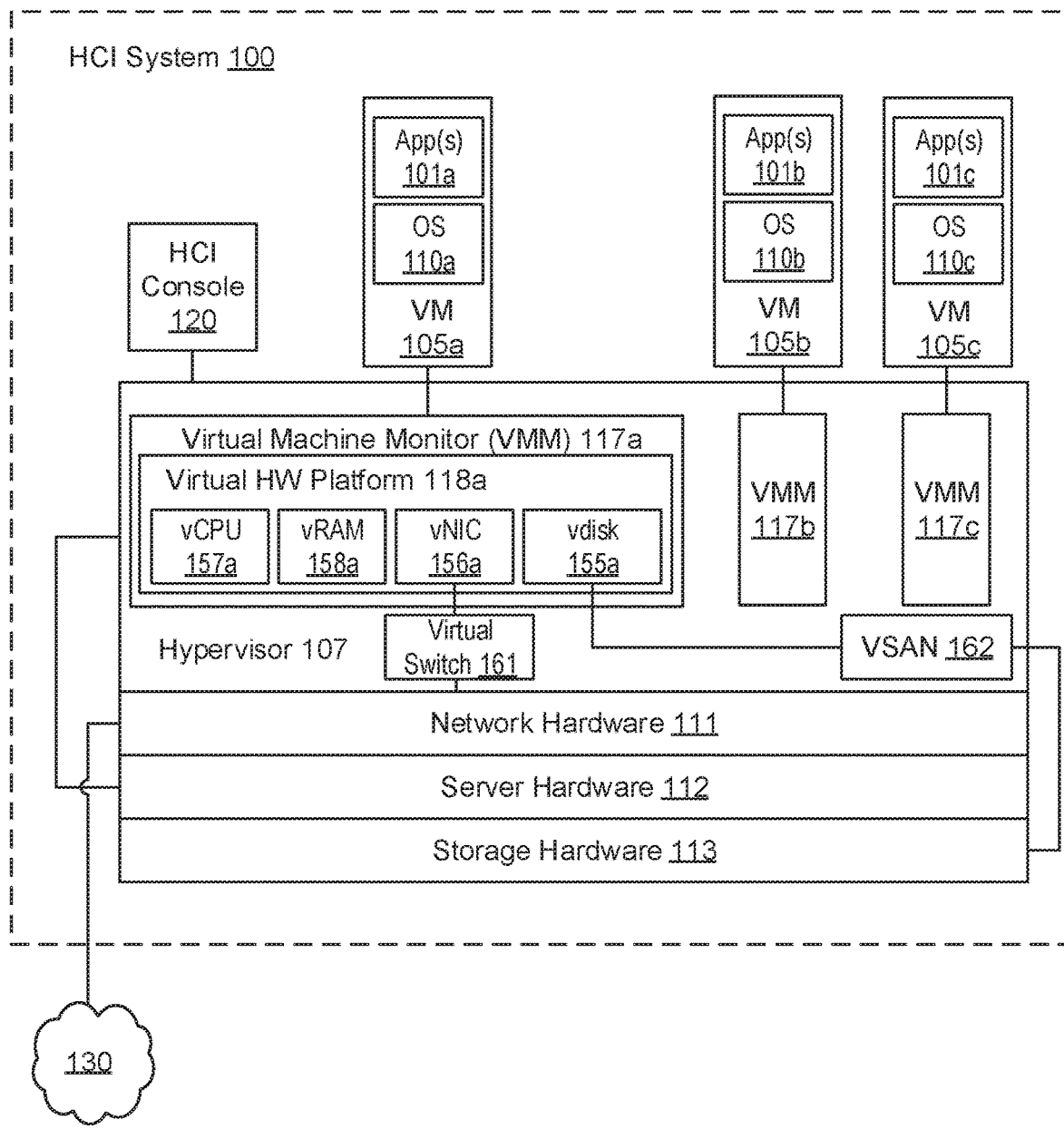
FIG. 1 is a block diagram of a computer system to which one or more embodiments may be applied.

FIG. 1 is a block diagram of an HCI system 100 to which one or more embodiments may be applied. HCI system 100 includes network hardware 111, server hardware 112, and storage hardware 113, each of which may be configured as a plurality of blade servers installed on a computer rack, for example, and virtualizes them using virtualization software, e.g., hypervisor 107.

Server hardware 112 is virtualized into a plurality of VMs, e.g., VMs 105a, 105b, 105c as depicted in FIG. 1. Each of the VMs is supported by a virtual hardware platform provisioned by hypervisor 107. For example, VM 105a is supported by virtualized hardware platform 118a that includes a virtual CPU 157a, virtual RAM 158a, virtual network interface controller 156a, and a virtual disk 155a. A virtual machine monitor is provided in hypervisor 107 for each of the VMs, e.g., VMM 117a for VM 105a, VMM 117b for VM 105b, and VMM 117c for VM 105c, and virtualized hardware platform 118a for VM 105a is provisioned within VMM 117a. Each VM has a guest operating system (OS) running therein to support execution of one or more applications. For example, VMs 105a, 105b, 105c have guest OSs 110a, 110b, 110c running respectively therein to support execution of one or more applications (apps) 101a, 101b, 101c, respectively.

Network hardware 111 includes physical network resources (e.g., one or more physical switches that interconnect blade servers that are part of server hardware 112), that are virtualized by hypervisor 107. One example of a virtualized physical network resource is depicted in FIG. 1 as virtual switch 161. Other network hardware 111 includes a router or a gateway connected to external network 130.

Storage hardware 113 includes a plurality of storage devices that are virtualized by hypervisor 107. In the embodiment described herein, the storage devices are virtualized into a virtual storage area network (VSAN) 162 and virtual disks are provisioned in VSAN 162.

In HCI system 100, different software layers of hypervisor 107 may be provided by different vendors. For example, the software layer for virtualizing network hardware 111 and the software layer for virtualizing storage hardware 113 may be provided by different vendors. In addition, drivers for the hardware components that are virtualized, and the hardware components themselves, may be provided by different vendors. As such, when an issue arises in these different layers of software and hardware, the user needs to determine which layer is causing the issue and then determine how to resolve the issue.

Figure 2:
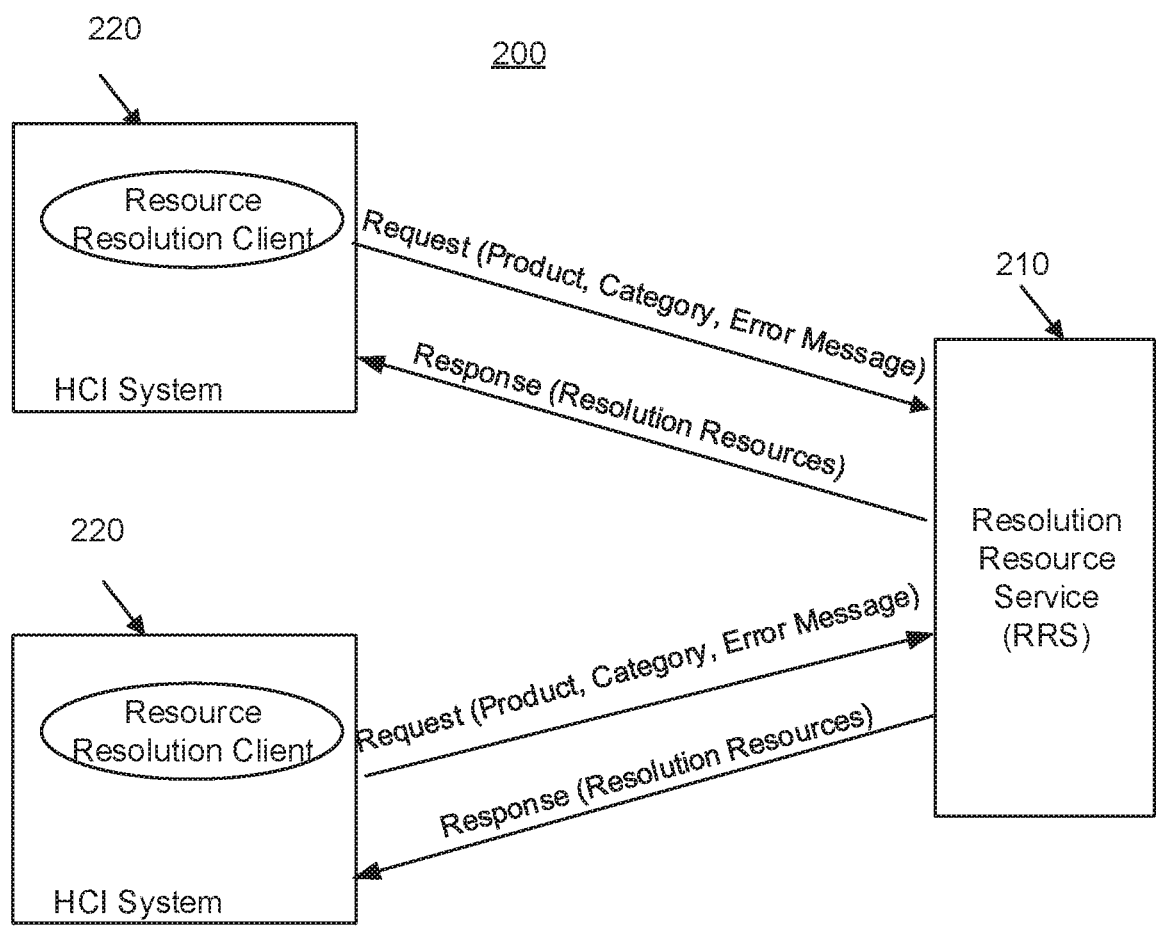
FIG. 2 shows a machine-learning-powered collaborative system according to an embodiment.

FIG. 2 shows a machine-learning-powered (ML-powered) collaborative system 200 that provides a service for empowering users with recommended resources based on searching against various vendor online web sites, smart system information retrieval, and peer-to-peer collaboration support. ML-powered collaborative system 200 includes two components: a resolution resource service (RRS) 210 and resolution resource clients (RRC) 220. Two RRCs 220 are shown in FIG. 2 as an example.

RRS 210 is software running in one or more servers including conventional components of a computer system (including one or more processors, memory, storage, and a network interface) and may be provisioned, e.g., as a Software-as-a-Service (SaaS) hosted in a public cloud computing system or an on-premise demilitarized zone (DMZ) located within a private or hybrid cloud computing system that is accessible by users outside a firewall. RRC 220 runs inside HCI system 100, e.g., as part of HCI console 120. Alternatively, RRC 220 may run in a virtual or physical machine that is separate from the HCI system.

When an error arises from an operation performed on an HCI system, the associated RRC 220 determines using conventional techniques from which layer the error originates, and sends an error message to RRS 210. Along with the error message, RRS 210 may also send product identifier (product ID of the layer where the error originated) and product category (product ID of the layer where the error originated), to RRS 210. Upon receiving this information, RRS 210 responds with resolution resources matching the error to enable the user to resolve the error. The resolution resources includes, for example, content resources associated with the error, Knowledge Base (KB) articles associated with the error, Service Reports (SRs) associated with the error, Support Engineer (SE) reports, bug reports, and user community threads. The HCI system may then display, to the user, the error message along with the resolution resources obtained from RRS 210.

The following are non-limiting examples of how the resolution resources are created. A KB article is created by a vendor to assist customers to solve a particular issue with a product sold by the vendor. An SR is created when a customer calls into a vendor and reports an issue, whereby a ticket is created based on the reporting of that issue. An SE report is created by a support engineer analyzing the SR and describing how the issue raised in the SR can be solved. A bug report is created when the support engineer cannot solve the issue raised in the report, and is sent to internal engineers of the vendor to delve deeper into the issue raised in the SR and possibly resolve that issue. A user community thread is created, e.g., from chat room discussions about a particular issue.

Upon receipt of an error message along with optional product ID and product category from RRC 220, RRS 210 searches for one or more KB articles that best match the description of the error in the error message. Then, a resource crawler running as a background process in RRS 210 periodically identifies any prior SRs and associated bug reports that are related to the issue, and if any matches are found, RRS 210 extracts useful information from the SRs and bug reports that are related to the issue, and provide that information to the user as additional resolution resources.

Content matching in RRS 210 is supplemented by a resource ranking service that generates a similarity score for each potential match and filters out those potential matches that do not meet a confidence threshold. To generate the similarity score, the resource ranking service employs a machine-learning model (more generally referred to herein as "data model") that is generated by an online training service (which executes a machine learning algorithm against relevant data sets to train the data model and improve the accuracy of the data model), and leverages an open source library for efficient word representation and classification, called Fasttext™. Using the data model and Fasttext, the resource ranking service determines the syntactic and semantic resemblance between a given resolution resource and the error description, and computes a similarity score based on the syntactic and semantic resemblance.

Figure 3:
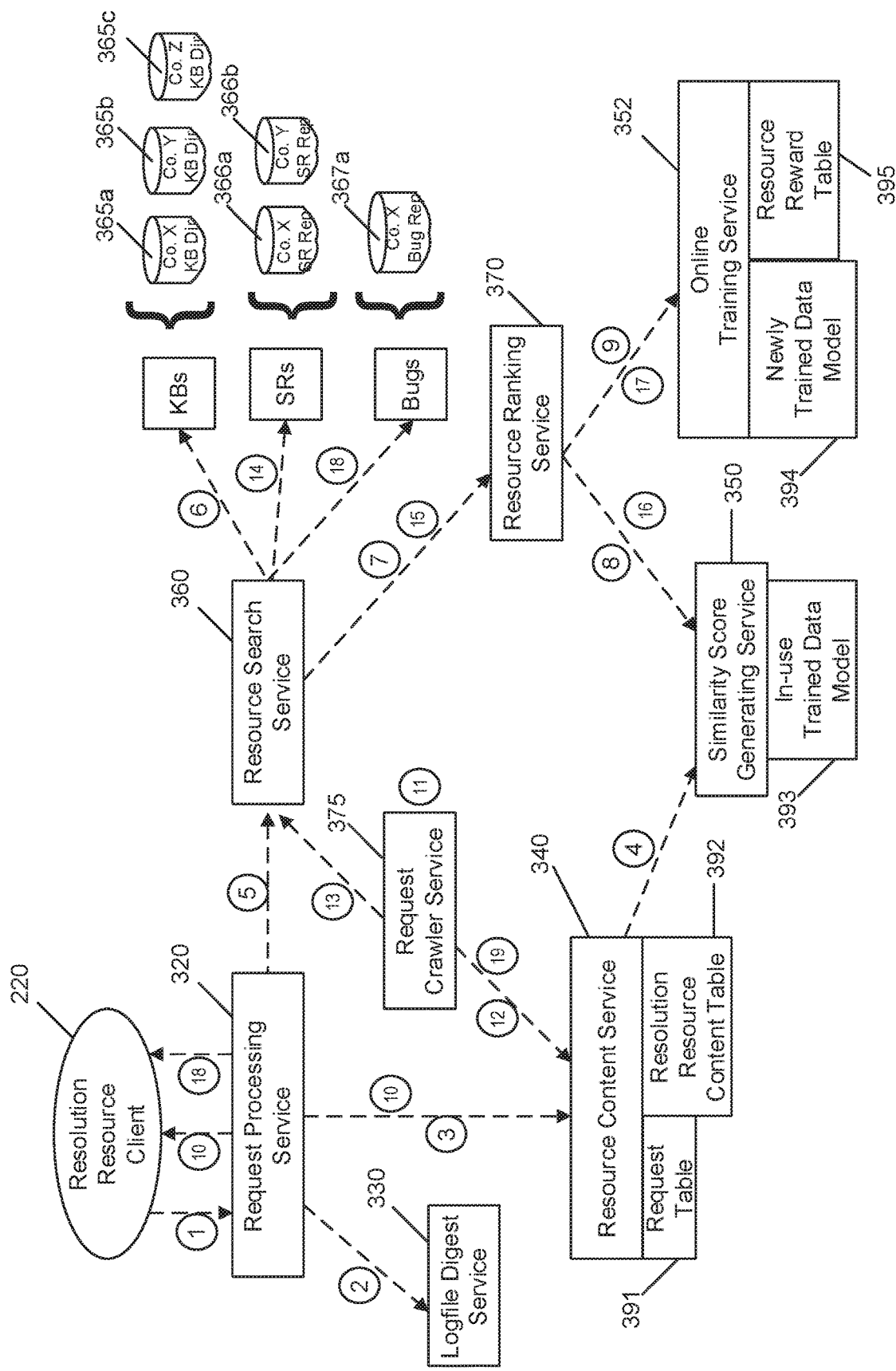
FIG. 3 provides a schematic diagram illustrating how an issue is processed by a resource resolution service according to an embodiment.

FIG. 3 provides a schematic diagram illustrating how an issue is processed by RRS 210. In FIG. 3, all of the elements except for RRC 220, KB repositories 365a-c, SR repositories 366a-b, and Bug repository 367a, are a part of RRS 210, and all such parts of RRS 210 depicted as services run as processes in the one or more servers of RRS 210.

Turning now to FIG. 3, RRC 220 in step 1 submits an issue that needs resolution in the form of a request with an error message (which contains an error description), product ID and product category, and log data (an error log). Upon receipt of that information from RRC 220, request processing service 320 in step 2 sends the error description and the log data to logfile digest service 330 to extract relevant passages from the log data. The error message, the product ID and category, and the relevant passages extracted from the log data are hereinafter referred to as user input data.

Then, request processing service 320 in step 3 checks with resource content service 340 to see if the issue has been encountered. As depicted in FIG. 3, resource content service 340 manages two different collections—a request table 391 and a resolution resource content table 392. Request table 391 keeps track of all requests and their creation time, user input data, and current status (i.e., whether it is open or closed). When the user sends the request, resource content service 340 updates applicable fields in request table 391. Resolution resource content table 392 contains all of the previously learned content for all reported issues. Each table entry of resolution resource content table 392 contains user input data and its identified resolution resources including KB articles, SRs, and bug reports along with their corresponding user feedback. For each new issue, a new entry is added into resolution resource content table 392. Initially, only KB articles are stored, but eventually more resolution resources are added to a same entry whenever resource crawler service 375 identifies an SR and associated bug reports. In addition, when new user review feedback is submitted, the corresponding entry in resolution resource content table 392 is amended.

Resource content service 340 determines whether or not the issue has been previously encountered by sending the request to a similarity score generating service 350 (e.g., Fasttext) or other type of word recognition service in step 4. Resource content service 340 determines that the issue is a new issue if similarity score generating service 350 indicates that there is no match with a previously learned request (i.e., similarity score is less than a threshold level representative of a probable match). If there is no match, request processing service 320 in step 5 passes the error description, product ID and product category, and the extracted relevant passages to resource search service 360, and resource search service 360 in step 6 searches for matching KB articles from various KB repositories 365a, 365b, 365c of different vendors that provide components of the HCI system.

Upon finding and retrieving matching KB articles, resource search service 360 in step 7 accesses resource ranking service 370 to rank the retrieved KB articles in step 8 using similarity score generating service 350. More specifically, similarity score generating service 350 generates a reference string from the request and an array of strings from the retrieved KB articles, and performs a comparison of the reference string and the array of strings based on a data model 393 (the contents of which are replaced time to time with a newly trained model as further described below) to generate similarity scores for each of the retrieved KB articles. In addition, resource ranking service 370 in step 9 passes the top-ranked KB articles (or KB articles having a similarity score above a threshold level) to online training service 352 and online training service 352 performs "rewarding" of the top-ranked KB articles as further described below.

The top-ranked KB articles are provided to request processing service 320, and in step 10, request processing service 320 returns the top-ranked KB articles to RRC 220 and instructs resource content service 340 to update request table 391 and resolution resource content table 392 accordingly.

If resource content service 340 after step 4 determines that the issue has been previously encountered, resource content service 340 retrieves the corresponding resolution resources from resolution resource content table 392 and returns them to RRC 220. In doing so, steps 5-9 are skipped.

Resource crawler service 375 is a background service running in RRS 210 that wakes up periodically (e.g., every minute or every 10 minutes) in step 11. Upon waking up, resource crawler service 375 in step 12, requests resource content service 340 for all requests that are still indicated as being open in request table 391. For each open request, resource crawler service 375 in step 13 instructs resource search service 360 to search for matching SRs in various SR repositories 366a, 366b.

Upon finding and retrieving matching SRs in step 14, resource search service 360 in step 15 accesses resource ranking service 370 to rank the retrieved SRs in step 16 using similarity score generating service 350. More specifically, similarity score generating service 350 generates a reference string from the request and an array of strings from the retrieved SRs, and performs a comparison of the reference string and the array of strings based on data model 393 to generate similarity scores for each of the retrieved SRs. In addition, resource ranking service 370 in step 17 passes the top-ranked SRs to online training service 352 (or SRs having a similarity score above a threshold level) and online training service 352 performs "rewarding" of the top-ranked SRs as further described below. In addition, resource search service 360 in step 18 searches for bug reports corresponding the top-ranked SRs.

The top-ranked SRs and the corresponding bug reports are provided to request crawler service 375, and in step 19, request crawler service 375 returns the top-ranked SRs and the corresponding bug reports to RRC 220 and instructs resource content service 340 to update resolution resource content table 392 accordingly.

Rewards are granted to highly relevant data to improve the accuracy of data model 394 that is generated by online training service 352. In one embodiment, such rewards granted to top-ranked resolution resources (e.g., top 3 ranked KB articles and top 3 ranked SRs). In addition, rewards are also granted to resolution resources that receive a high user rating (e.g., greater than or equal to three stars in a five star rating system).

When a reward is granted to a resolution resource, online training service 352 makes a record of the granted reward in resource rewards table 395. In addition, online training service 352 makes a duplicate of the corresponding entry in resolution resource content table 392 so that online training service 352, during training of data model 394 in accordance with the steps of FIG. 4, encounters the resolution resource more than once. However, to prevent the resulting data model to be skewed too heavily towards any one resolution resource, an upper limit is placed on how many times a resolution resource can be rewarded. Thus, if the number of rewards granted to any resolution resource exceeds an upper limit, e.g., 3, online training service 352 does not carry out the step of making a duplicate of the corresponding entry in resolution resource content table 392.

Figure 4:
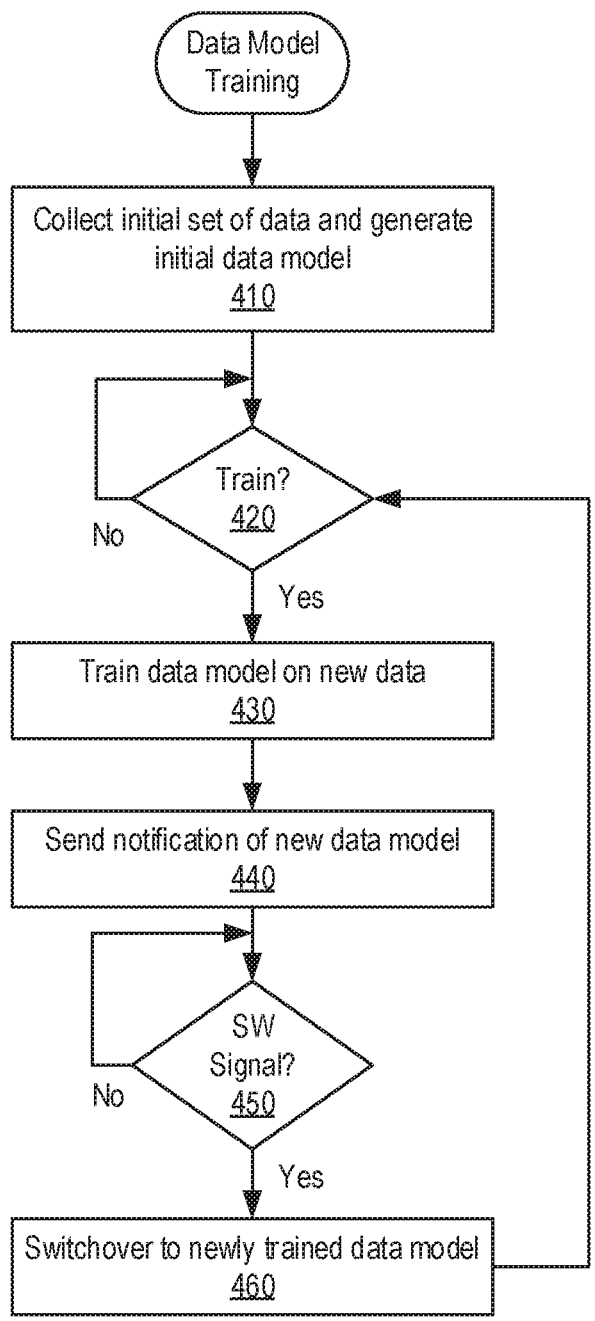
FIG. 4 is a flow diagram showing steps involved in training a data model according to one or more embodiments.

FIG. 4 is a flow diagram showing steps involved in training a data model according to one or more embodiments. In the embodiments, two data models 393, 394 are maintained, one for ranking and the other for training, because training of a data model typically takes some time to complete. Therefore, while data model 394 is being trained, data model 393 is being actively used by similarity score generating service 350.

Initially, resource ranking service 370 in step 410 collects all possible textual data available to it from various vendors of HCI system components, which may include KB articles, online blogs, books and articles on computer-related topics, etc. Online training service 352 executes a machine learning algorithm against this corpus of data to generate the initial data model that is used as both data model 393 and data model 394.

In step 420, online training service 352 waits for a condition to conduct training to be satisfied. The condition to conduct training may be a lapse of a certain amount of time since the last training or a certain amount of entries added to resolution resource content table 392. When the condition to conduct training is satisfied (step 420, Yes), online training service 352 in step 430 conducts the training of data model 394 with the entries added to resolution resource content table 392.

When the training of data model 394 has completed, online training service 352 in step 440 notifies similarity score generating service 350 that a new data model is available and in step 450 waits for a return signal from similarity score generating service 350, which indicates that a switchover to a new data model can be carried out atomically at that time. For example, when similarity score generating service 350 receives the notification while it is currently executing and accessing data model 393, it waits until the current execution has completed before sending the return signal to online training service 352. Similarity score generating service 350 also places any new processing requests in a queue. Upon receiving the signal (step 450, Yes), online training service 352 in step 460 copies data model 394 (which is now newly trained) to a temp file, deletes the file representing data model 393, and renames the temp file to the name of the file representing data model 393. After step 460, online training service 352 returns to executing step 352 to wait again for the condition to conduct training to be satisfied, and similarity score generating service 350 executes the processing requests placed in the queue using the newly trained data model.

FIG. 5 is a sample dashboard 500 that illustrates resolution resources returned by RRS 210 to RRC 220. Resolution resources depicted in FIG. 5 include KB articles, SRs, bug reports, and engineering insights. In particular, FIG. 5 shows four KB articles each having a similarity score greater than a threshold value (e.g., greater than 70%), a related SR, and a related engineering insight, all of which were returned in response to a request having the problem description "Errors occurred on the disk(s) of a VSAN host." Also depicted within dashboard 500 is a related SR document and a related engineering insight document. Each of the articles and documents shown in FIG. 5 is displayed with a "View/Add" button using which the user can rate a particular resolution resource.

Figure 6:
FIG. 6 is a sample user feedback page using which the user can rate and comment on the resolution resources returned thereto.

FIG. 6 is a sample user feedback page 600 which is displayed upon a user clicking on a View/Add button depicted in FIG. 5. In user feedback page 900, the user may enter a rating of one to five stars and provide comments. In the example illustrated in FIG. 6, the user gave a rating of four stars (which would result in a reward being granted to this resolution resource) in region 610 and entered a comment of "very helpful" in region 620. When the user clicks on submit button 630 upon completing his or her inputs, corresponding entries in resolution resource content table 392 and rewards table 395 are updated (or added).

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of processing requests from one or more users of a computer system having software and hardware components, wherein each of the requests includes a description of an issue with one of the software and hardware components, said method comprising:
    executing a machine learning algorithm against data sets of prior requests and associated prior responses to generate a data model;
    upon receiving a first request, performing content matching using a first instance of the data model to determine if an issue described in the first request has been previously encountered;
    executing the machine learning algorithm against a new data set to update a second instance of the data model, the new data set including one or more requests made after the prior requests, and responses associated therewith;
    after the second instance of the data model has been updated, switching the data model used for performing content matching from the first instance of the data model to the second instance of the data model; and
    upon receiving a second request after the data model used for performing content matching has been switched from the first instance of the data model to the second instance of the data model, performing content matching using the second instance of the data model to determine if an issue described in the second request has been previously encountered.

2. The method of claim 1, further comprising:

upon determining that the issue described in the first request has been previously encountered, returning one of the prior responses, which is associated with the first request, in response to the first request; and upon determining that the issue described in the first request has not been previously encountered, searching for resources relevant to the issue described in the first request and returning one or more of the resources in response to the first request.

3. The method of claim 2, further comprising:

upon determining that the issue described in the first request has not been previously encountered, performing content matching on the resources using the first instance of the data model, wherein the one or more of the resources returned to the user in response to the first request each satisfy a minimum similarity threshold.

4. The method of claim 3, further comprising:

after performing the content matching on the resources using the first instance of the data model, executing the machine learning algorithm against another new data set to update the second instance of the data model, wherein said another new data set includes the first request and the one or more of the resources returned in response to the first request.

5. The method of claim 4, wherein the one or more of the resources returned in response to the first request includes a first resource and a second resource, and the other new data set includes the first resource, a duplicate of the first resource, the second resource, and a duplicate of the second resource.

6. The method of claim 5, wherein the first resource has a highest similarity score among the one or more of the resources returned to the user in response to the first request and the second resource has a user rating greater than or equal to a threshold user rating.

7. The method of claim 1, further comprising:

placing in a queue one or more of the requests that are received after the first request and before the switching, wherein the switching of the data model from the first instance of the data model to the second instance of the data model occurs at a time after a notification that the second instance of the data model is ready for the switching, is issued, and all of the one or more of the requests in the queue have been processed using the first instance of the data model.

8. The method of claim 1, wherein the machine learning algorithm is executed against the new data set when a predetermined amount of time has passed since the second instance of the data model has been used to perform the content matching.

9. The method of claim 1, wherein the machine learning algorithm is executed against the new data set when a predetermined number of requests has been made since the second instance of the data model has been used to perform the content matching.

10. The method of claim 2, wherein the resources searched include knowledge base articles and service reports.

11. The method of claim 10, wherein the knowledge base articles are searched synchronously upon determining that the issue described in the first request has not been previously encountered, and the service reports are searched as a background process that is executed periodically.

12. A non-transitory computer readable medium comprising instructions executable on a processor to cause the processor to carry out a method of processing requests from one or more users of a computer system having software and hardware components, wherein each of the requests includes a description of an issue with one of the software and hardware components, and said method comprises:

Executing a machine learning algorithm against data sets of prior requests and associated prior responses to generate a data model;

upon receiving a first request, performing content matching using a first instance of the data model to determine if an issue described in the first request has been previously encountered;

executing the machine learning algorithm against a new data set to update a second instance of the data model, the new data set including one or more requests made after the prior requests, and responses associated therewith;

after the second instance of the data model has been updated, switching the data model used for performing content matching from the first instance of the data model to the second instance of the data model; and upon receiving a second request after the data model used for performing content matching has been switched from the first instance of the data model to the second instance of the data model, performing content matching using the second instance of the data model to determine if an issue described in the second request has been previously encountered.

13. The non-transitory computer readable medium of claim 12, wherein the method further comprises:

upon determining that the issue described in the first request has been previously encountered, returning one of the prior responses, which is associated with the first request, in response to the first request; and upon determining that the issue described in the first request has not been previously encountered, searching for resources relevant to the issue described in the first request and returning one or more of the resources in response to the first request.

14. The non-transitory computer readable medium of claim 13, wherein the method further comprises:

upon determining that the issue described in the first request has not been previously encountered, performing content matching on the resources using the first instance of the data model, wherein the one or more of the resources returned to the user in response to the first request each satisfy a minimum similarity threshold.

15. The non-transitory computer readable medium of claim 14, wherein the method further comprises:

after performing the content matching on the resources using the first instance of the data model, executing the machine learning algorithm against another new data set to update the second instance of the data model, wherein said another new data set includes the first request and the one or more of the resources returned in response to the first request.

16. The non-transitory computer readable medium of claim 12, wherein the method further comprises:

placing in a queue one or more of the requests that are received after the first request and before the switching, wherein the switching of the data model from the first instance of the data model to the second instance of the data model occurs at a time after a notification that the second instance of the data model is ready for the switching, is issued, and all of the one or more of the requests in the queue have been processed using the first instance of the data model.

17. The non-transitory computer readable medium of claim 12, wherein the machine learning algorithm is executed against the new data set when a predetermined amount of time has passed since the second instance of the data model has been used to perform the content matching.

18. The non-transitory computer readable medium of claim 12, wherein the machine learning algorithm is executed against the new data set when a predetermined number of requests has been made since the second instance of the data model has been used to perform the content matching.

19. A machine-learning-powered computer system for processing requests from one or more users of another computer system having software and hardware components, wherein each of the requests includes a description of an issue with one of the software and hardware components, said machine-learning-powered computer system comprising:
　a processor; and
　a memory storing instructions executable on the processor,
　wherein the processor executing the instructions performs the steps of:
　　executing a machine learning algorithm against data sets of prior requests and associated prior responses to generate a data model;
　　upon receiving a first request, performing content matching using a first instance of the data model to determine if an issue described in the first request has been previously encountered;
　　executing the machine learning algorithm against a new data set to update a second instance of the data model, the new data set including one or more requests made after the prior requests, and responses associated therewith;
　　after the second instance of the data model has been updated, switching the data model used for performing content matching from the first instance of the data model to the second instance of the data model; and
　　upon receiving a second request after the data model used for performing content matching has been switched from the first instance of the data model to the second instance of the data model, performing content matching using the second instance of the data model to determine if an issue described in the second request has been previously encountered.

20. The machine-learning-powered computer system of claim 19, further comprising:
　upon determining that the issue described in the first request has been previously encountered, returning one of the prior responses, which is associated with the first request, in response to the first request; and
　upon determining that the issue described in the first request has not been previously encountered, performing content matching on resources using the first instance of the data model, and returning one or more of the resources that satisfy a minimum similarity threshold, in response to the first request.

* * * * *